United States Patent [19]

Rieder et al.

[11] 4,446,195
[45] May 1, 1984

[54] NOVEL POLYESTERS COATED ON CONDUCTIVE SUBSTRATE

[75] Inventors: Werner Rieder, Vienna, Austria; Martin Fehrle, Bietigheim-Bissingen, Fed. Rep. of Germany

[73] Assignee: Isovolta Osterreichische Isolierstoffwerke Aktiengesellschaft, Wiener Neudorf, Austria

[21] Appl. No.: 471,298

[22] Filed: Mar. 2, 1983

Related U.S. Application Data

[62] Division of Ser. No. 375,204, May 5, 1982, Pat. No. 4,387,209.

[30] Foreign Application Priority Data

Dec. 9, 1981 [AT] Austria .................................. 5278/81
May 7, 1981 [EP] European Pat. Off. ....... 81-890076.3

[51] Int. Cl.³ ........................ B32B 27/06; B32B 27/36
[52] U.S. Cl. .................................... 428/458; 427/117; 428/379; 428/480
[58] Field of Search ................ 427/117; 428/379, 458, 428/480

[56] References Cited

U.S. PATENT DOCUMENTS 4,393,121  7/1983  Tobias et al. ....................... 428/458

Primary Examiner—Marion McCamish
Attorney, Agent, or Firm—Bierman, Bierman & Peroff, Muserlian

[57] ABSTRACT

An organic, high-molecular weight polyester containing substantially chain members of the formula

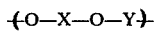

wherein X is at least one member of the group consisting of

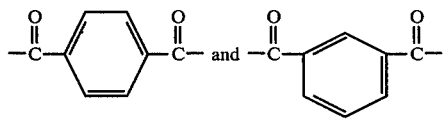

and Y has the formula

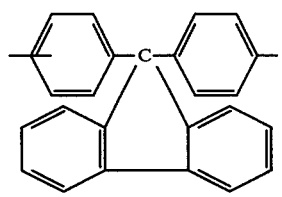

having an inherent viscosity of at least 1.0 dl/g, preferably at least 1.2, dl/g measured at 30° C. in a solution of 0.5 g of the polyester in 100 ml of a mixture of 60% by weight of phenol and 40% by weight of 1,1,2,2-tetrachloroethane and whose films cast from a chlorinated organic solution have an elongation at break of at least 10%, preferably at least 20%, measured according to ASTM D-882-75 b with the proviso that if the inherent viscosity is between 1.0 dl/g and 1.5 dl/g, Y is a mixture of 70 to 30% of terephthalic acid and 30 to 70% of isophthalic acid having excellent properties for electrical insulation as well as other fields.

14 Claims, No Drawings

NOVEL POLYESTERS COATED ON CONDUCTIVE SUBSTRATE

This is a division of Ser. No. 375,204 filed May 5, 1982, U.S. Pat. No. 4,387,209.

STATE OF THE ART

U.S. Pat. Nos. 3,216,970 and 3,351,624 of Conix describe the preparation of linear polyesters of aromatic dicarboxylic acids such as terephthalic acid and isophthalic acid and various aromatic diphenols including 1,1-bis-(4-hydroxyphenyl)-1-phenyl-ethane but these polyesters have a relatively low molecular weight as evidenced by the low intrinsic viscosity values reported for the polyesters in the patent. It is to be noted that the intrinsic viscosity values reported by Conix would be less if reported as inherent viscosity values used in the present invention.

For example, Example 6 of U.S. Pat. No. 3,216,970 reports for the polyester of 1,1-bis-(4-hydroxyphenyl)-1-phenyl-ethane and isophthaloyl chloride an intrinsic viscosity of only 0.7 dl/g and an elongation at break of 17% in a different test. Example 11 of the same patent reports for the polyester of 1,1-bis-(4-hydroxyphenyl)-1-phenyl-ethane and terephthaloyl chloride an intrinsic viscosity of 0.83. Example 3 of U.S. Pat. No. 3,351,624 is the same as Example 11 of the earlier Conix patent. With polyesters of this type, it is not possible to cast films or make coatings which have desired mechanical and electrical insulation properties to be used for electrical insulation.

U.S. Pat. No. 3,546,165 of Morgan describes thermally stable polyesters of various gen-bis-phenols and various dicarboxylic acids. Included within the scope of the patent are polyesters of 9,9-bis-(4-hydroxyphenyl)-fluorene and isophthalic acid and/or terephthalic acid but they generally have a relatively low inherent viscosity of about 0.8 to less than 1.0 dl/g as measured in the present invention and less than desirable mechanical properties. Although a few higher values are reported by the patent, applicants have not been able to obtain values greater than 1.0 dl/g by the procedure taught in the patent.

OBJECTS OF THE INVENTION

It is an object of the invention to provide improved polyesters having mechanical and electrical insulation properties so they can be successfully used in the electrical insulation field.

It is another object of the invention to provide films and powders of high molecular weight polyesters with an inherent viscosity of at least 1.0 dl/g and an improved elongation at break.

It is a further object of the invention to provide a novel method of insulating an electrical conductor by providing the conductor with a coating of high molecular weight polyester of the invention.

It is an additional object of the invention to provide an electrical insulating tape comprising a film of a high molecular weight polyester of 9,9-bis-(4-hydroxyphenyl)-fluorene and isophthalic acid and/or terephthalic acid of the invention having good adhesive properties, especially to metal surfaces.

These and other objects and advantages of the invention will become obvious from the following detailed description.

THE INVENTION

The novel polyesters of the invention are organic, high-molecular weight polyesters containing substantially chain members of the formula

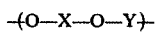

wherein X is at least one member of the group consisting of

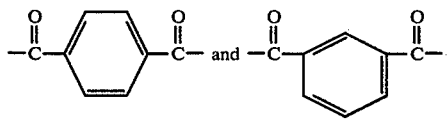

and Y has the formula

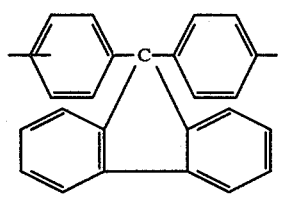

having an inherent viscosity of at least 1.0, preferably at least 1.2, dl/g measured at 30° C. in a solution of 0.5 g of the polyester in 100 ml of a mixture of 60% by weight of phenol and 40% by weight of 1,1,2,2-tetrachloroethane and whole films cast from a chlorinated organic solution have an elongation at break of at least 10%, preferably at least 20% measured according to ASTM D 882-75 b with the proviso that if the inherent viscosity is between 1.0 and 1.5 dl/g, Y is a mixture of 70 to 30% of terephthalic acid and 30 to 70% of isophthalic acid, preferably 50%-50%.

The polyesters of the invention have many desirable physical properties which make them valuable for the electrical insulation field. These properties include a high tensile strength, excellent dimensional properties, high temperature stability, good flame retardant properties, good adhesion to metals, good electrical insulation properties as seen from the dielectric strength and dissipation factors and excellent mechanical properties as well as good water absorption properties.

The novel process for the preparation of the polyesters having an inherent viscosity of at least 1.0 dl/g comprises reacting 9,9-bis-(4-hydroxyphenyl)-fluorene or a functional derivative thereof with at least one acid selected from the group consisting of terephthalic acid and isophthalic acid and functional derivatives thereof in a suitable organic solvent. The functional derivative of the said diphenol may be an alkali metal diphenolate such as sodium, potassium or lithium and the functional acid derivative may be an acid halide. The process is more fully described in commonly assigned U.S. patent application Ser. No. 260,939 filed May 6, 1981.

It has been found that it is preferred to use as pure as possible form of 9,9-bis-(4-hydroxyphenyl)-fluorene as indicated by its melting range to obtain polyesters with as high an inherent viscosity as possible. For example, when the said diphenol has a melting range of 224° to 230° C. or 229 to 231° C., the resulting polyester with an equimolar mixture of terephthalic and isophthalic acid can result in products having an inherent viscosity of 1.04 and 1.32 dl/g, respectively.

A process for the preparation of phenol-aromatic ketone condensation products by reaction of phenols and ketones in the presence of a gaseous hydrogen halide described in copending patent application Ser. No. 2560,669 filed Apr. 3, 1981 comprises adding in catalytic amounts up to less than molar amounts based on the ketones as an additional condensation agent at least one bivalent, trivalent or tetravalent metal halide, introducing the gaseous hydrogen halide and after termination of the condensation reaction, adding water to the reaction mixture and recovering the purified condensation product to form monomers of 9,9-bis-(4-hydroxyphenyl)-fluorene with a melting point of at least 226° C. and 1,1-bis-(4-hydroxyphenyl)-1-phenylethane with a melting point of at least 189° C. which contain minor residual amounts of metal catalyst.

A preferred mode of the process comprises reacting an aqueous phase containing the disodium salt of 9,9-bis-(4-hydroxyphenyl)-fluorene with a melting range of at least 229° to 231° C. with an organic phase containing acid chloride of at least one acid selected from the group consisting of isophthalic acid and terephthalic acid in a suitable organic solvent in the presence of a phase transfer catalyst such as benzyltriethylammonium chloride or tetrabutylammonium iodide to obtain a polyester with an inherent viscosity of at least 1.0, preferably 1.2 dl/g or higher. The polyesters of terephthalic acid along tend to have higher inherent viscosities.

The dicarboxylic acids may be used individually or as mixtures, preferably in a ratio of 70 to 30% of terephthalic acid to 30 to 70% by weight of isophthalic acid, and most preferably as an equimolar mixture of terephthalic acid and isophthalic acid as the elongation at break values are higher.

The polyesters of the invention may be made in the form of thin films, preferably with a thickness of 0.010 to 0.25 mm preferably 0.020 to 0.150 mm by known methods such as forming a solution of the polyester in a suitable organic solvent, forming a film of the solution on a smooth surface, evaporating the organic solvent and removing the resulting polyester film.

As noted above, the polyester films of the invention have excellent electrical insulation properties and more important have excellent mechanical properties as indicated by their elongation at break and dimensional stability. Moreover, the good mechanical properties permit the production of good quality films without regard to production related fluctuations.

Polyesters based on 9,9-bis-(4-hydroxyphenyl)-fluorene and isophthalic and/or terephthalic acid will form films with an inherent viscosity of 0.4 dl/g but a suitable elongation at break value is only reached with the novel polyesters of the invention having an inherent viscosity of at least 1.0 dl/g, preferably more than 1.2 dl/g. The polyesters with an inherent viscosity of 1.0 to 1.5 dl/g will have an elongation at break of about 10% or more and in the inherent viscosity range of 1.5 to 2.0 dl/g, the elongation at break will be even higher.

In the polyesters of the invention, the inherent viscosity of the polyesters is greatly dependent upon the purity of the monomer and even relatively small variations in the purity of the diphenol monomer can cause large deviations in the inherent viscosity values. The elongation at break values with polyesters of an inherent viscosity of 1.5 to 2.5 dl/g, preferably 1.8 to 2.4 dl/g do not appear to change as rapidly with an increase in inherent viscosity as they do at lower inherent viscosities. The result is that elongation at break values can be more consistent under actual production conditions.

Polyesters with an inherent viscosity of more than 2.5 dl/g are usually only obtained with a diphenol of extremely high purity so as to be impractical and those polyesters are not sufficiently soluble in chlorinated organic solvents to obtain film casting solutions of the desired optimum viscosity.

The polyester films of the invention also have a higher limiting oxygen index measured by ASTM D 2863-77 than the prior art polyesters with a lower inherent viscosity. Polymers with a high oxygen index are becoming more important, especially in uses when smoke formation and the toxicity of the decomposition products due to thermal decomposition of the polymer, especially due to fire, can not be tolerated. The polyesters of the invention have a very high degree of thermal stability which is a desirable property for electrical insulation purposes.

The polyesters of the invention may contain small amounts, i.e. up to 10% by weight, preferably 5 to 8% by weight of another organic diphenolic compound such as those of the formula

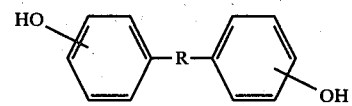

wherein R is selected from the group consisting of alkyl, acyl, cycloalkyl, aryl and halogenated methylene or other hydrocarbon group as described in U.S. Pat. No. 3,216,970.

The polyesters of the invention may also contain small amounts, i.e. up to 10%, preferably 5 to 8% by weight, of cross-linking agents such as 1,2-divinylbenzene, 1,4-divinylbenzene, 1,3-divinylbenzene, 1,1,1-trimethylolpropane trimethacrylate and the bismaleimide or 4,4'-diaminodiphenylmethane of the formula

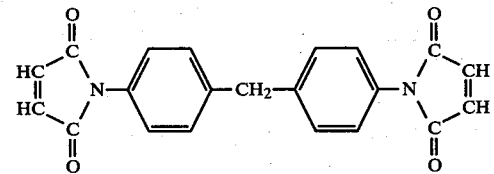

or 3,3'-diallyl-bisphenol A or terephthalic acid substituted in ortho position with —CH₂—CH=CH₂ or —COOCH₂—CH=CH₂.

The coated electrical conductors of the invention are comprised of an electrical conductor provided with an electrically insulating layer of a polyester of the invention having an inherent viscosity of at least 1.0 dl/g and an elongation at break of at least 10%. The layer may be applied in any suitable manner such as by wrapping the electrical conductor, preferably if it is in wire form, with a film or adhesive tape, especially a pressure sensitive tape, of the polyester or by placing a heated conductor in a fluidized bed of polyester powder or any other known means such as extrusion or hot melt techniques.

At least some of the polyesters of the invention also have an interesting binodal distribution which indicates that the polyesters not only contain high molecular weight components but also a minor amount of e.g. 10 to 20% of a low molecular weight component which appears to increase the adhesive qualities of the polyesters making them more useful in the electrical insulation field.

In the following examples there are described several preferred embodiments to illustrate the invention. However, it should be understood that the invention is not intended to be limited to the specific embodiments.

EXAMPLE 1

1,051 g (3.0 moles) of 9,9-bis-(4-hydroxyphenyl)-fluorene were dissolved at 70° C. in a solution of 264 g of sodium hydroxide, 2.5 liters of isopropanol and 5.0 liters of distilled water and after cooling the mixture to room temperature, 1 liter of distilled water was added to the disodium phenolate solution.

The resulting solution was added to a coolable reaction vessel provided with a high speed stirrer, thermometer and a metering pump followed by the addition of 15 liters of distilled 1,2-dichloroethane and a room temperature solution of 34.5 g (0.15 moles) of benzyl triethylammonium chloride in 200 ml of distilled water. The mixture was vigorously stirred while adding over 25 minutes a solution of 304.5 g (1.5 moles) of isophthaloyl chloride and 304.5 g (1.5 moles) of terephthaloyl chloride in 2.0 liters of 1,2-dichloroethane which had been stored under anhydrous conditions while keeping the temperature below 40° C. The mixture was stirred for 45 minutes during which the viscosity increased.

The resulting mixture was allowed to stand for 15 minutes to form an aqueous phase which was discarded and an highly viscous organic phase. The latter was washed three times with 30 liters of water each time and was then vigorously stirred with 30 liters of isopropanol after which the desired polyester precipitated. The mixture was filtered and the polyester product was admixed with an additional 30 liters of isopropanol. The mixture was centrifuged and the recovered product was washed twice with 10 liters of water each time to remove residual inorganic salts. The resulting polyester product was dried in a circulating air oven at 130° C. for 15 hours to obtain a constant weight product of 1,383 g (96% yield) of the polyester. The inherent viscosity was determined to be 1.73 dl/g using a solution of 0.5 g of the polyester in 100 ml of a mixture of 60% by weight of phenol and 40% by weight of 1,1,2,2-tetrachloroethane and a Ubbelohde viscometer at 30° C. (capillary constant-0.01).

EXAMPLE 2

1,051 g (3.0 moles) of 9,9-bis-(4-hydroxyphenyl)-fluorene with a melting range of 228°-230° C. were added at 70° C. to a solution of 264 g of sodium hydroxide, 3.0 liters of dioxane and 5.0 liters of distilled water and after cooling the mixture to room temperature, 1 liter of distilled water was added thereto. The rest of the procedure was the same as Example 1 to obtain 1,368 g (95% yield) of the desired polyester with an inherent viscosity of 2.3 dl/g.

EXAMPLE 3

A solution of 5.75% by weight of the polyester of Example 1 in 1,2-dichloroethane was used as a coating solution in a film casting machine to form a film of the polyester with a thickness of 0.040 mm. The elongation at break of the film was determined by ASTM D 882-75 b to be 22%. Another film of the polyester of Example 1 with a thickness of 0.125 mm was prepared from the same casting solution and the oxygen index of the film was determined by ASTM D 2683-77 to be 33%.

EXAMPLE 4

Using the procedure of Example 1, 2 moles of 9,9-bis-(4-hydroxyphenyl)-fluorene and 2 moles of an equimolar mixture of terephthaloyl chloride and isophthaloyl chloride in the presence of dioxane with benzyl triethylammonium chloride as catalyst were reacted for 2 hours to obtain a polyester with an inherent viscosity of 1.32 dl/g. Machine cast films of the said polyester in dichloroethane had an elongation at break of 19% using the ASTM test of Example 3.

EXAMPLE 5

To demonstrate the advantageous properties obtained by the use of a more pure monomer, 2 moles of 9,9-bis-(4-hydroxyphenyl)-fluorene with a melting range of 222°-231° C. (product A), 224°-230° C. (product B) and 229°-231° C. (product C) and 2 moles of an equimolar mixture of isophthaloyl chloride and terephthaloyl chloride were reacted in the presence of isopropanol with benzyltriethylammonium chloride as catalyst to obtain the corresponding polyesters whose inherent viscosity and elongation at break are reported in Table I.

TABLE I

| Polyester of monomer | Inherent viscosity dl/g | % elongation at break |
|---|---|---|
| A | 0.71 | 10 |
| B | 1.04 | 10 |
| C | 1.32 | 19 |

The results of Table I clearly show that the more pure the starting diphenol monomer, the better properties of the resulting polyester as indicated by the higher inherent viscosity and percentage of elongation at break.

EXAMPLE 6

In order to demonstrate the advantageous properties of the polyesters of the invention, the films of the above examples were subjected to a series of tests and the results are reported in the following Table. The dielectric constant and dielectric factor were determined by DIN 53483 and the dielectric strength which is an important measured value was determined in volts per mil. The limiting oxygen index was determined by ASTM D 2863-77 of films of the thickness of 0.025 mm and elongation at break and tensile strength were determined by DIN 53455 and the elastic modulus was determined by DIN 53457. The gel permeation chromatogram was also determined together with a thermogravimetric analysis. The puncture resistance and high temperature film shrinkage and film weight loss were determined as well as the degree of water absorption.

The samples tested were all mixtures of 50% terephthalic acid-50% isophthalic acid and they have the inherent viscosity listed in the Table.

TABLE

| Film No. (inherent | Dielectric constant at | Dissipation factor | Dielectric strength in | Limiting oxygen | % elongation at break - | Tensile strength | Elastic modulus |
|---|---|---|---|---|---|---|---|

TABLE-continued

| Film No. (inherent viscosity) | 1.0 KHz | at 1.0 KHz | volts/mil | index % O₂ | max. | K psi | K psi |
|---|---|---|---|---|---|---|---|
| 1 (0.71) | 3.0 | 0.006 | 2851 | 22.5 | 10 | 11.9 | 268 |
| 2 (0.88) | — | 0.006 | 3741 |  | 9.5 | 9.7 | 301 |
| 3 (1.04) | 3.0 | 0.005 | 3534 | 22.5 | 10 | 13.3 | 296 |
| 4 (1.32) | 3.2 | 0.006 | 3318 |  | 19 | 12.9 | 247 |
| 5 (1.67) | 3.3 | 0.003 | 2880 | 25.5 | 24 | 18.0 | 406 |
| 6 (2.30) | 3.2 | 0.004 | 3728 | 26.5 | 24 | 19.1 | 420 |

| Film No. (inherent viscosity) | Thermogravimetric analysis °C. at 20% loss in N₂ | Puncture resistance in lbs/mil | Penetration temp. °F. | % Films shrinkage after 15 min. at 200° C. | Water Absorption % change in weight | % weight loss at 220° C. for 24 hours |
|---|---|---|---|---|---|---|
| 1 (0.71) |  | 1.6 | 638 | — | +.37 | — |
| 2 (0.88) | 530° C. | 2.4 | 550 | 2.01 | +.66 | −6.2 |
| 3 (1.04) |  | 2.4 | 650 | 0.78 | +.36 | −2.3 |
| 4 (1.32) |  | 4.5 | 655 | 1.17 | — | −3.8 |
| 5 (1.67) | 550° C. | 4.5 | 650 | 0.50 | +.67 | −0.65 |
| 6 (2.30) | 615° C. | 4.3 | 640 | 0.39 | +.32 | 0 |

From the values of the above Table, it can be seen that the elongation at break, limiting oxygen index, high temperature film shrinkage, high temperature film weight loss, tensile strength and elastic modulus values are very good for the films with a higher inherent viscosity.

Various modifications of the products and methods of the invention may be made without departing from the spirit or scope thereof and it is to be understood that the invention is intended to be limited only as defined in the appended claims.

What we claim is:

1. An electrical conductor provided with an electrically insulating layer of an organic, high-molecular weight polyester containing substantially chain members of the formula

—(O—X—O—Y)— wherein X is at least one member of the group consisting of

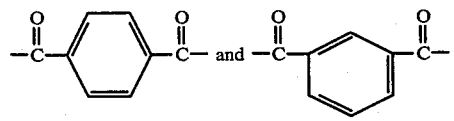

and Y has the formula

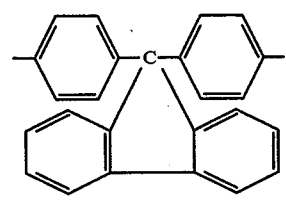

having an inherent viscosity of at least 1.0 dl/g measured at 30° C. in a solution of 0.5 g of the polyester in 100 ml of a mixture of 60% by weight of phenol and 40% by weight of 1,1,2,2-tetrachloroethane and whose films cast from a chlorinated organic solution have an elongation at break of at least 10% measured according to ASTM D-882-75 b with the proviso that if the inherent viscosity is between 1.0 and 1.5 dl/g, Y is a mixture of 70 to 30% of terephthalic acid and 30 to 70% of isophthalic.

2. A conductor of claim 1 wherein the inherent viscosity of the polyester is at least 1.2 dl/g.

3. A conductor of claim 1 wherein the elongation at break of the polyester is at least 20%.

4. A conductor of claim 1 wherein X is the polyester mixture of 70 to 30% by weight of

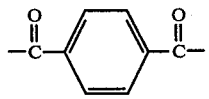

and 30 to 70% by weight of

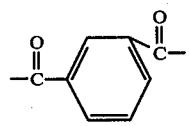

5. A conductor of claim 4 wherein the mixture is a 50% to 50%.

6. A conductor of claim 1 wherein the inherent viscosity of the polyester is greater than 1.5 dl/g.

7. A conductor of claim 1 wherein the inherent viscosity of the polyester is greater than 1.8 dl/g.

8. A method of insulating an electrical conductor comprising providing the exterior surface of the electrical conductor with an electrically insulating layer of an organic, high-molecular weight polyester containing substantially chain members of the formula

—O—X—O—Y— wherein X is at least one member of the group consisting of

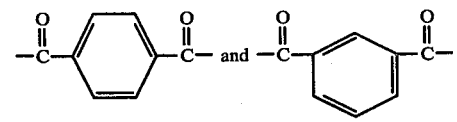

and Y has the formula

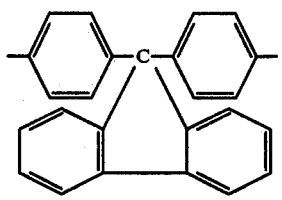

having an inherent viscosity of at least 1.0 dl/g measured at 30° C. in a solution of 0.5 g of the polyester in 100 ml of a mixture of 60% by weight of phenol and 40% by weight of 1,1,2,2-tetrachloroethane and whose films cast from a chlorinated organic solution have an elongation at break of at least 10% measured according to ASTM D-882-75 b with the proviso that if the inherent viscosity is between 1.0 and 1.5 dl/g, Y is a mixture of 70 to 30% of terephthalic acid and 30 to 70% of isophthalic.

9. The method of claim 8 wherein the inherent viscosity of the polyester is at least 1.2 dl/g.

10. The method of claim 8 or 9 wherein X is a mixture of 70 to 30% by weight of

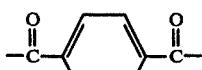

and 30 to 70% by weight of

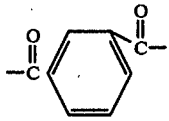

11. The method of claim 10 wherein the mixture is a 50% to 50%.

12. The method of claim 11 wherein the inherent viscosity of the polyester is greater than 1.5 dl/g.

13. The method of claim 12 wherein the inherent viscosity of the polyester is greater than 1.8 dl/g.

14. The method of claim 8 wherein the elongation at break of the polyester is at least 20%.

* * * * *